US012666137B2

(12) United States Patent
Shiono

(10) Patent No.: US 12,666,137 B2
(45) Date of Patent: Jun. 23, 2026

(54) IMAGE PROCESSING APPARATUS, NON-TRANSITORY COMPUTER READABLE MEDIUM STORING PROGRAM, AND IMAGE PROCESSING METHOD FOR MANAGING IMAGES OF A PLURALITY OF RELATED DOCUMENTS AS A GROUP

(71) Applicant: FUJIFILM Business Innovation Corp., Tokyo (JP)

(72) Inventor: Yuto Shiono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,235

(22) Filed: Mar. 24, 2023

(65) Prior Publication Data

US 2024/0031671 A1 Jan. 25, 2024

(30) Foreign Application Priority Data

Jul. 22, 2022 (JP) ................................ 2022-117571

(51) Int. Cl.

*H04N 23/60* (2023.01)
*H04N 1/195* (2006.01)
*H04N 23/63* (2023.01)

(52) U.S. Cl.

CPC ......... *H04N 23/64* (2023.01); *H04N 1/19594* (2013.01); *H04N 23/633* (2023.01)

(58) Field of Classification Search

CPC ... H04N 23/64; H04N 23/633; H04N 1/19594
USPC ........................................................... 358/401
See application file for complete search history.

(56) References Cited

U.S. PATENT DOCUMENTS

| | | | | |
|---|---|---|---|---|
| 7,103,837 | B2 * | 9/2006 | Sato | G06F 40/106 715/275 |
| 7,933,048 | B2 * | 4/2011 | Koike | G06V 30/412 382/209 |
| 8,427,672 | B2 * | 4/2013 | Matsuno | G06F 16/34 358/1.14 |
| 8,934,151 | B1 * | 1/2015 | Lin | H04N 1/00474 358/448 |
| 10,719,201 | B2 * | 7/2020 | Noguchi | G06F 3/0483 |
| 11,265,440 | B2 | 3/2022 | Yana | |
| 2018/0367694 | A1 | 12/2018 | Asakawa et al. | |
| 2021/0281711 | A1 | 9/2021 | Yana | |

FOREIGN PATENT DOCUMENTS

JP 6737341 8/2020

OTHER PUBLICATIONS

"Search Report of Europe Counterpart Application", issued on Dec. 11, 2023, pp. 1-8.

* cited by examiner

*Primary Examiner* — Gabriel I Garcia
(74) *Attorney, Agent, or Firm* — JCIPRNET

(57) ABSTRACT

An image processing apparatus includes a processor configured to display, in a case where there are plural sets each consisting of plural documents, and plural sheets of documents including at least one sheet of a document of each of all or part of the plural sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging.

9 Claims, 15 Drawing Sheets

10

41 CONTROL UNIT

42 COMMUNICATION UNIT

43 DISPLAY INPUT UNIT

44 STORAGE UNIT

45 IMAGE SCANNING UNIT

46 IMAGE FORMING UNIT

47 IMAGE OUTPUT UNIT

48 IMAGING UNIT

49 IRRADIATION UNIT

IMAGE PROCESSING APPARATUS, NON-TRANSITORY COMPUTER READABLE MEDIUM STORING PROGRAM, AND IMAGE PROCESSING METHOD FOR MANAGING IMAGES OF A PLURALITY OF RELATED DOCUMENTS AS A GROUP

CROSS-REFERENCE TO RELATED APPLICATIONS

This application is based on and claims priority under 35 USC 119 from Japanese Patent Application No. 2022-117571 filed Jul. 22, 2022.

BACKGROUND

(i) Technical Field

The present invention relates to an image processing apparatus, a non-transitory computer readable medium storing a program, and an image processing method.

(ii) Related Art

JP6737341B describes an image forming apparatus in which, even for a plurality of small-size documents, an image of a front side and an image of a back side of each document can be superimposed and formed on the image positions of the front and back sides which have been aligned on the front and back of one sheet of recording paper.

SUMMARY

In an image processing apparatus such as a multifunction machine, an imaging unit such as a camera may be provided, and an image may be acquired by imaging a document by using the imaging unit.

In this case, for example, a plurality of related documents such as the front side and the back side of a business card are imaged one by one in order, and the acquired images of the plurality of documents are associated with each other, thereby managing the images of the plurality of related documents as a group.

In a case where there are a plurality of sets each consisting of a plurality of related documents, and a plurality of sheets of documents including one sheet of document of each set are simultaneously imaged, unless documents of each set are placed within a range in which the documents can be regarded as the same set of documents for each imaging, it is not possible to associate the images of documents of each set.

Aspects of non-limiting embodiments of the present disclosure relate to an image processing apparatus, a non-transitory computer readable medium storing a program, and an image processing method that capable of allowing a user to know a position where the document of each set is placed, in a case where there are a plurality of sets each consisting of a plurality of documents and a plurality of sheets of documents including one sheet of document of each set are simultaneously imaged.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to: display, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging.

BRIEF DESCRIPTION OF THE DRAWINGS

Exemplary embodiment(s) of the present invention will be described in detail based on the following figures, wherein:

FIG. 1A is a side view of the image forming apparatus and FIG. 1B is a front view of the image forming apparatus;

DETAILED DESCRIPTION

Figure 1B:
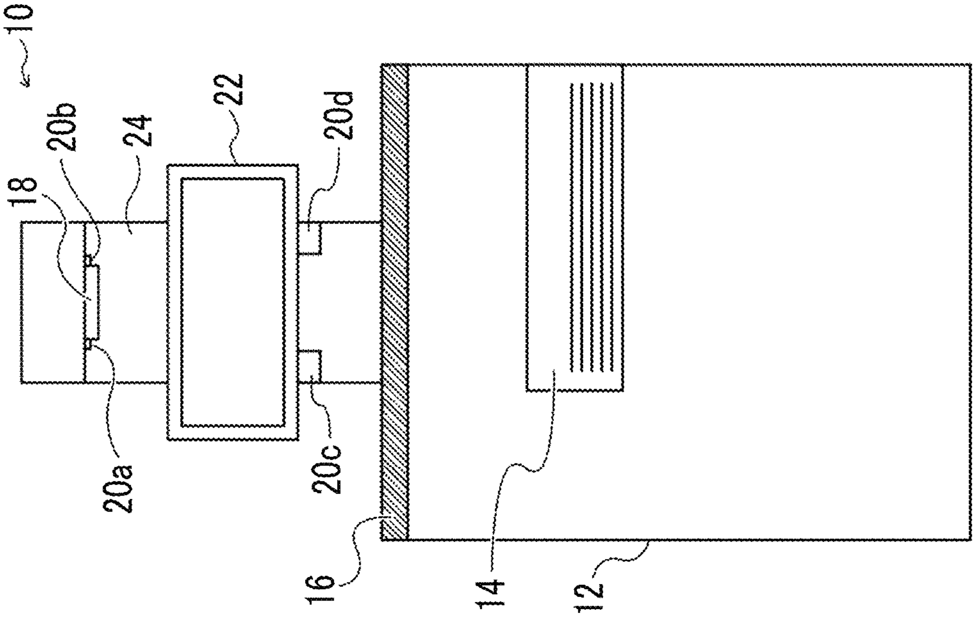
FIGS. 1A and 1B are views showing an external appearance of an image forming apparatus according to an exemplary embodiment of the present invention, where
Figure 1A:
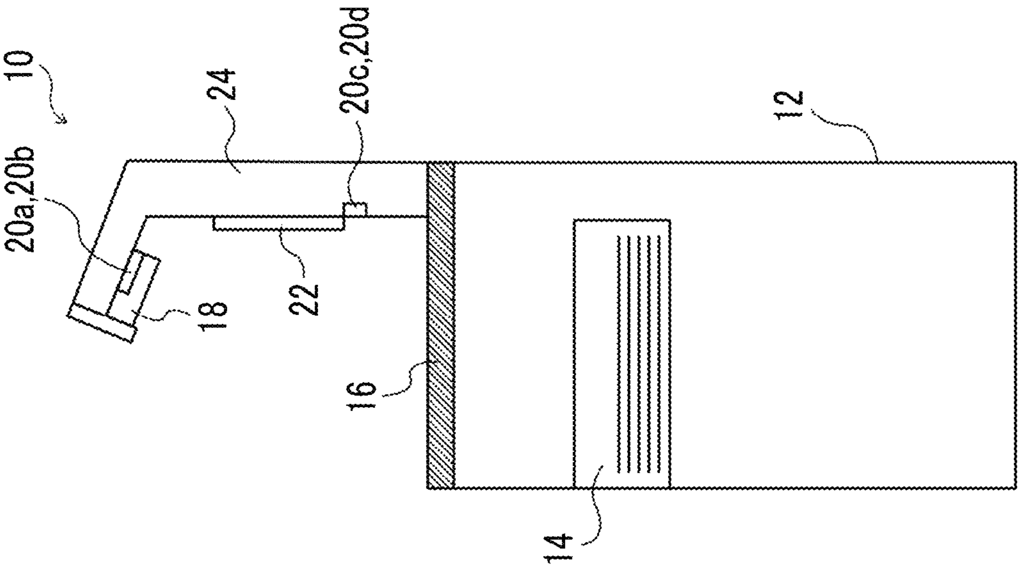

Hereinafter, an exemplary embodiment of the present invention will be described in detail with reference to the accompanying drawings. FIGS. 1A and 1B are views showing an external appearance of an image forming apparatus 10 as an example of an image processing apparatus according to an exemplary embodiment of the present invention, where FIG. 1A is a side view of the image forming apparatus 10 and FIG. 1B is a front view of the image forming apparatus 10. The image forming apparatus 10 is an apparatus installed in an office such as a multifunction machine.

As shown in FIG. 1, the image forming apparatus 10 includes an apparatus main body 12, a discharge tray 14 as a medium discharge unit, a placement unit 16, an imaging device 18, an irradiation device 20 including four light sources 20a, 20b, 20c, and 20d, an operation panel 22, or the like.

The discharge tray 14 is where paper, which is an example of a medium, is discharged. Further, the discharge tray 14 is provided at a position where the medium is taken out by the user in a standing state.

The placement unit 16 is a top surface of the apparatus main body 12, to be described in detail later, and is disposed on an upper portion of the apparatus main body 12. Further, the placement unit 16 is installed above the discharge tray 14 in the vertical direction. Further, the placement unit 16 is configured such that a document such as a paper, a business card, or a receipt can be placed.

The imaging device 18 includes an imaging element such as a charge coupled device (CCD), for example, and images a subject such as a document to acquire image data. The imaging device 18 is installed above the placement unit 16, and is configured to image the document placed on the placement unit 16 from above. Here, in a case where the upper surface of the placement unit 16 is used as the reference plane, the term "above the placement unit 16" is not limited to the position vertically above the reference plane, and means a position that is above in the vertical direction and is higher than the reference plane.

Further, a column 24 is provided on the top surface of the apparatus main body 12 and on the back of the upper surface of the placement unit 16. The column 24 extends upward substantially perpendicular to the upper surface of the placement unit 16, and is provided with an end portion bent above the placement unit 16. The imaging device 18 is attached to an end portion of the column 24.

An image forming unit, which forms an image of a subject placed on the placement unit 16, is provided between the discharge tray 14 and the placement unit 16. That is, an image forming unit that forms an image on the paper discharged to the discharge tray 14 is provided above the discharge tray 14.

The irradiation device 20 includes one or more light sources such as, for example, a light emitting diode (LED), and includes, for example, the light sources 20*a*, 20*b*, 20*c*, and 20*d*. The light sources 20*a*, 20*b*, 20*c*, and 20*d* are provided on the column 24. That is, the light sources 20*a*, 20*b*, 20*c*, and 20*d* are provided above the placement unit 16.

Specifically, the light sources 20*a* and 20*b* are provided in the vicinity of the imaging device 18, downward on both sides of the imaging device 18 of the column 24. The light sources and 20d are provided in the vicinity of the operation panel 22, obliquely downward on both sides of the column 24 at the lower end of the operation panel 22.

That is, the light sources 20*a* and 20*b* and the light sources 20*c* and 20*d* are arranged at positions with different heights from the placement unit 16. That is, the light sources 20*a*, 20*b*, and 20*d* are disposed at positions where the angles of light hitting the subject are different from each other, and are configured to irradiate the document with light from different directions. Thereby, the discriminability between the document and the placement unit 16 is improved.

The operation panel 22 includes a display screen, and is configured to set the image forming apparatus 10. The operation panel 22 is installed on the column 24 between the placement unit 16 and the imaging device 18, at the back of the apparatus main body 12.

A document feeder having a double-sided simultaneous scanning function is provided inside the apparatus main body 12 below the top plate of the placement unit 16. It is configured that the document feeder can be used by sliding a part of the top plate of the placement unit 16 in the plane direction.

Figure 2:
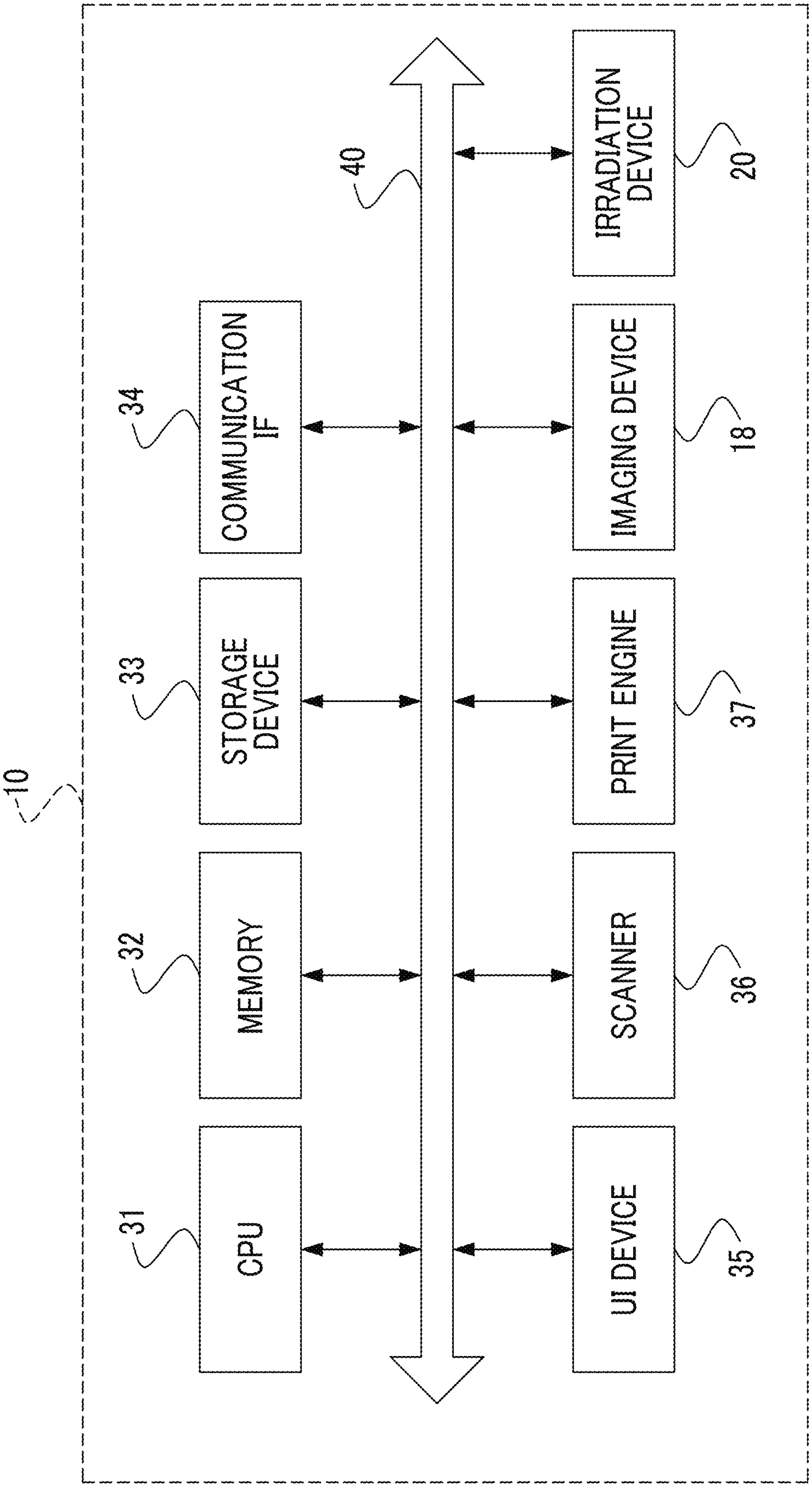
FIG. 2 is a block diagram showing a hardware configuration of the image forming apparatus.

Next, the hardware configuration of the image forming apparatus 10 of the present exemplary embodiment will be described. FIG. 2 is a block diagram showing a hardware configuration of the image forming apparatus 10.

As shown in FIG. 2, the image forming apparatus 10 includes a CPU 31, a memory 32, a storage device 33 such as a hard disk drive, a communication interface (abbreviated as IF) 34 that transmits and receives data to and from an external device or the like via a network, a user interface (abbreviated as UI) device 35 including a touch panel or a liquid crystal display, and a keyboard, a scanner 36, a print engine 37, the imaging device 18, and the irradiation device 20. These components are connected to each other via the control bus 40.

The communication IF 34 transmits and receives data to and from an external device or the like. The UI device 35 receives an instruction input from the user. The scanner 36 scans the document loaded in the image forming apparatus 10 as image data. The print engine 37 prints an image on a recording medium such as printing paper through steps such as charging, exposure, development, transfer, and fixing.

The CPU 31 is a processor that controls the operation of the image forming apparatus 10 by executing a predetermined process based on a control program stored in the memory 32 or the storage device 33. In the present exemplary embodiment, it has been described that the CPU 31 reads and executes the control program stored in the memory 32 or the storage device 33, but the present invention is not limited thereto. The control program may be provided in a form recorded on a computer-readable recording medium. For example, this program may be provided in the form recorded on an optical disk such as a compact disc (CD)-read only memory (ROM) and a digital versatile disc (DVD)-ROM, or the form recorded on a semiconductor memory such as a universal serial bus (USB) memory and a memory card. Further, the control program may be acquired from an external device via a communication line connected to the communication IF 34.

Figure 3:
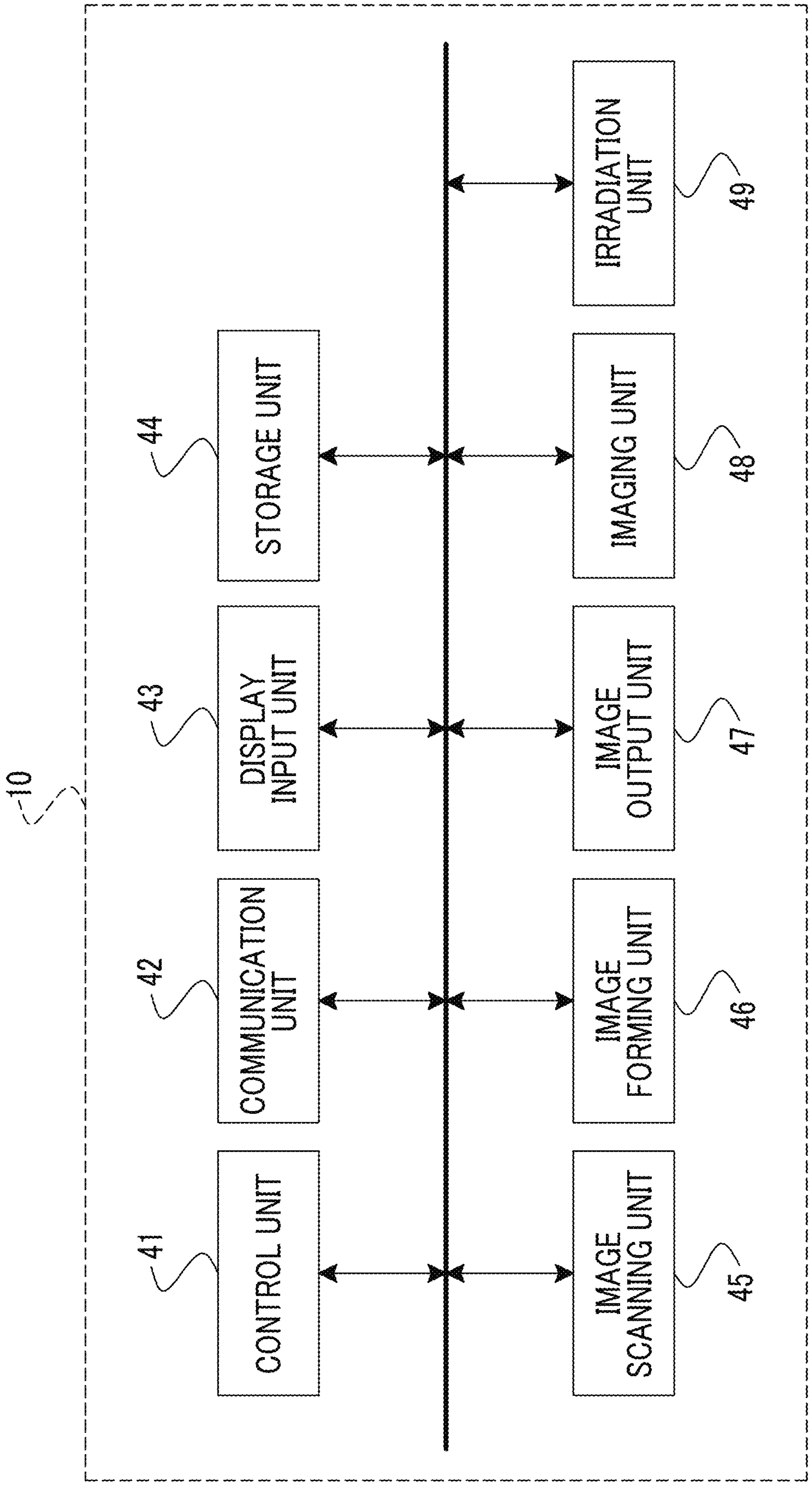
FIG. 3 is a block diagram showing a functional configuration of the image forming apparatus.

Next, the functional configuration of the image forming apparatus 10 of the present exemplary embodiment will be described. FIG. 3 is a block diagram showing a functional configuration of the image forming apparatus 10.

As shown in FIG. 3, the image forming apparatus 10 includes a control unit 41, a communication unit 42, a display input unit 43, a storage unit 44, an image scanning unit 45, an image forming unit 46, an image output unit 47, an imaging unit 48, and an irradiation unit 49.

The control unit 41 controls the overall operation of the image forming apparatus 10, and for example, based on an instruction input from the user, performs control of imaging the document by the imaging unit 48, control of outputting printing data such as a document image by the image output unit 47, or the like.

The communication unit 42 transmits and receives data to and from an external device. The display input unit 43 displays various types of information on the display screen of the operation panel 22, based on the control by the control unit 41. Further, the display input unit 43 inputs various types of operation information performed by the user on the operation panel 22. The display input unit 43 is an example of a display unit in the technique of the present disclosure. The storage unit 44 stores various types of data such as image data generated by the control unit 41 in addition to the control program.

The image scanning unit 45 performs a scanning operation of scanning various documents, based on the control by the control unit 41. The image forming unit 46 forms an image to be output from the image output unit 47, based on the control by the control unit 41. The image output unit 47 outputs the image formed by the image forming unit 46 onto a recording medium such as printing paper, based on the control by the control unit 41.

The imaging unit 48 images the document placed on the placement unit 16, based on the control by the control unit 41. The irradiation unit 49 irradiates the document placed on the placement unit 16 with light, based on the control by the control unit 41.

The image forming apparatus 10 of the present exemplary embodiment images a plurality of related documents, for example, such as the front side and the back side of a business card, one by one in order, and associates the acquired images of the plurality of documents with each other, thereby managing the images of the plurality of related documents as a group.

Further, in a case where there are a plurality of sets each consisting of a plurality of documents, a plurality of sheets of documents including one sheet of a document of each set may be simultaneously imaged. In this case, unless documents of each set are placed within a range in which the documents can be regarded as the same set of documents for each imaging, it is not possible to associate the images of documents of each set.

Therefore, in the present exemplary embodiment, in a case where there are a plurality of sets each consisting of a plurality of documents, and a plurality of sheets of documents including at least one sheet of a document of each of all or part of the plurality of sets are simultaneously imaged by the imaging unit 48, the control unit 41 displays guidance information for guiding a placement position of the document of each set to be superimposed on the image imaged by the imaging unit 48 and representing a current state, on the display input unit 43, in second and subsequent imaging, by using information pertaining to documents acquired in past imaging.

Here, the "plurality of documents included in each set" may be, for example, a front-side document and a back-side document of one medium such as a business card, or may be documents of a plurality of media. Further, the documents of a plurality of media may be included in one set, and both sides of the front-side document and the back-side document may be used as the documents for some of the media.

Further, regarding a set for simultaneous imaging, at least two or more sets may be mixed, among a set consisting of a front-side document and a back-side document of one medium, a set consisting of documents of a plurality of media, and a set of documents of a plurality of media and having both sides of the front-side document and the back-side document for some of the media as documents.

In the present exemplary embodiment, as an example, two sets each consisting of a front-side document and a back-side document of one medium are simultaneously imaged.

Further, the "image representing the current state captured by the imaging unit 48" may be a still image or a moving image. In the present exemplary embodiment, as an example, a moving image representing the current state is displayed on the display input unit 43. In addition, a moving image showing the current state is also called a live view. In the following description, a moving image showing the current state will be referred to as a live view.

Figure 4:
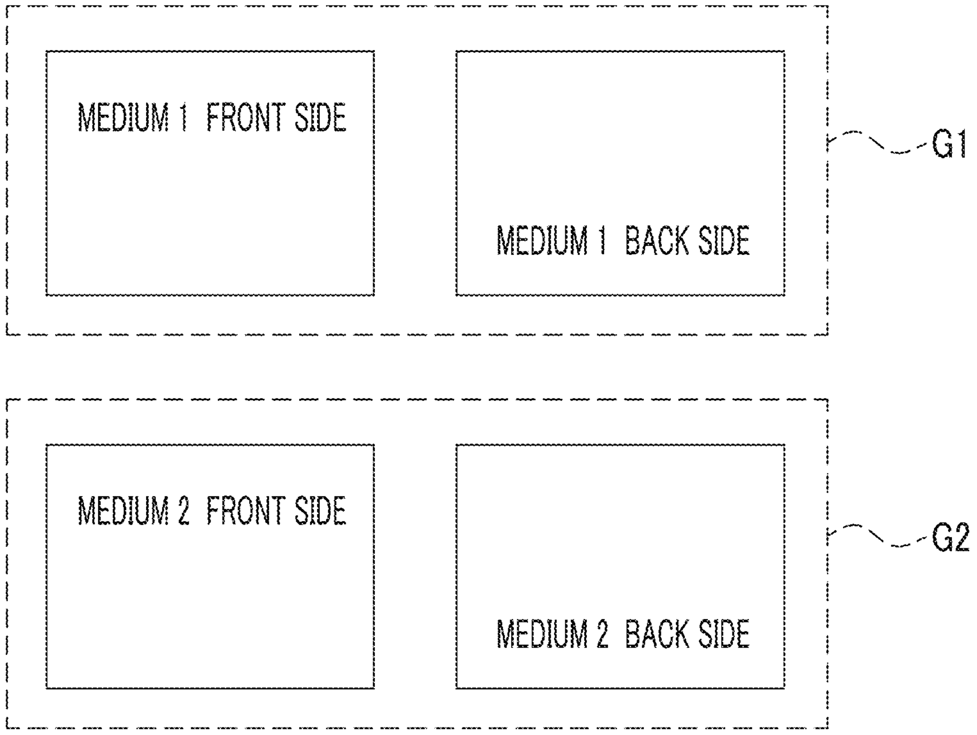
FIG. 4 is a diagram illustrating an example of documents of each of a plurality of sets to be simultaneously imaged.

Hereinafter, the process in the image forming apparatus 10 of the present exemplary embodiment will be described in detail. First, documents of each of a plurality of sets to be simultaneously imaged will be described. FIG. 4 is a diagram illustrating an example of documents of each of a plurality of sets to be simultaneously imaged.

As shown in FIG. 4, in the present exemplary embodiment, a case where two sets of documents G1 and G2 are simultaneously imaged will be described as an example. The set G1 consists of a front-side document of the medium 1 and a back-side document of the medium 1. The set G2 consists of a front-side document of the medium 2 and a back-side document of the medium 2.

In the first imaging, the front-side document of the medium 1 of the set G1 and the front-side document of the medium 2 of the set G2 are simultaneously imaged, and in the second imaging, the back-side document of the medium 1 of the set G1 and the back-side document of the medium 2 of the set G2 are simultaneously imaged.

Figure 5:
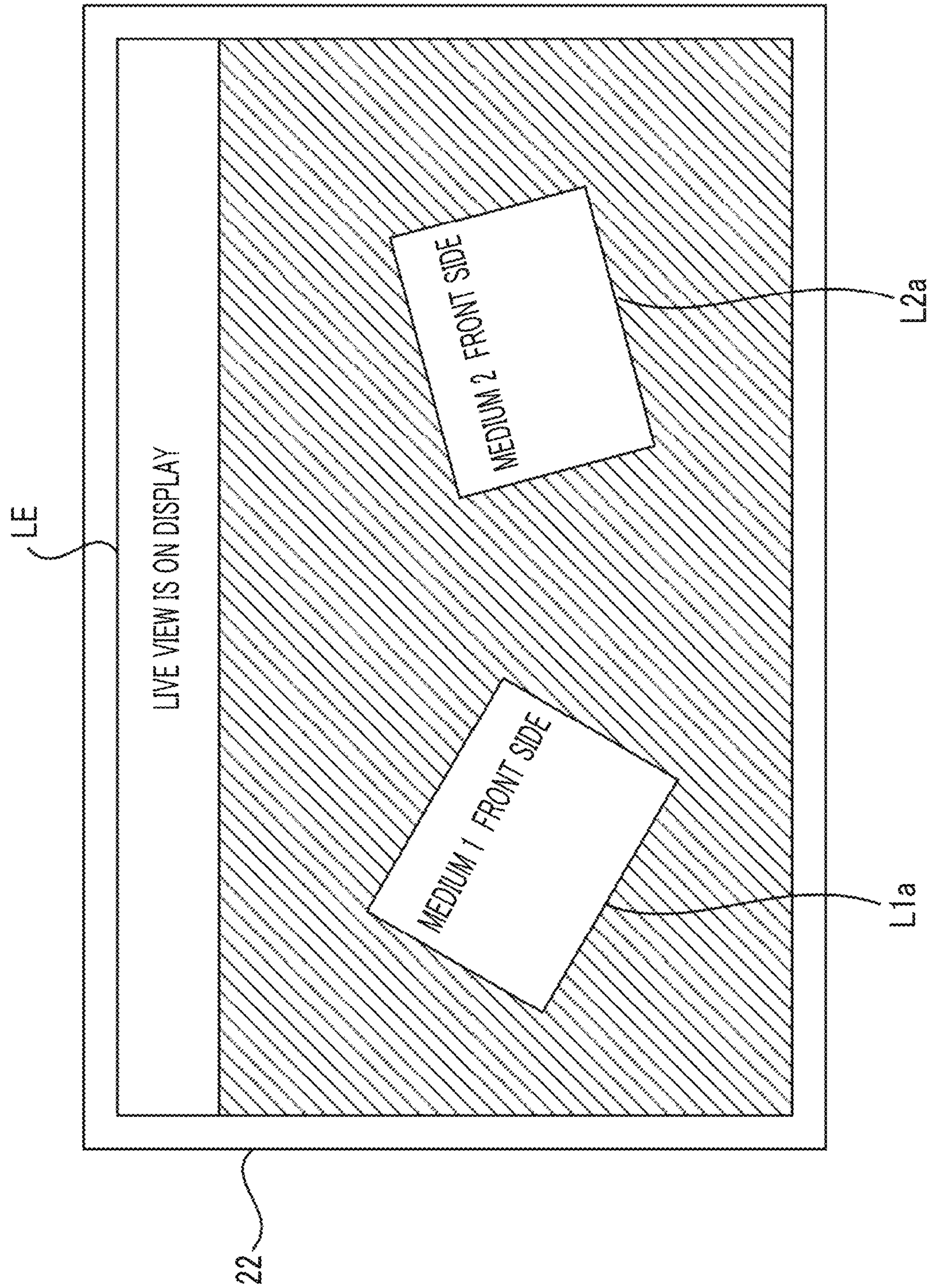
FIG. 5 is a diagram showing an example of a display state of a live view at the time of first imaging for two sets.
Figure 6:
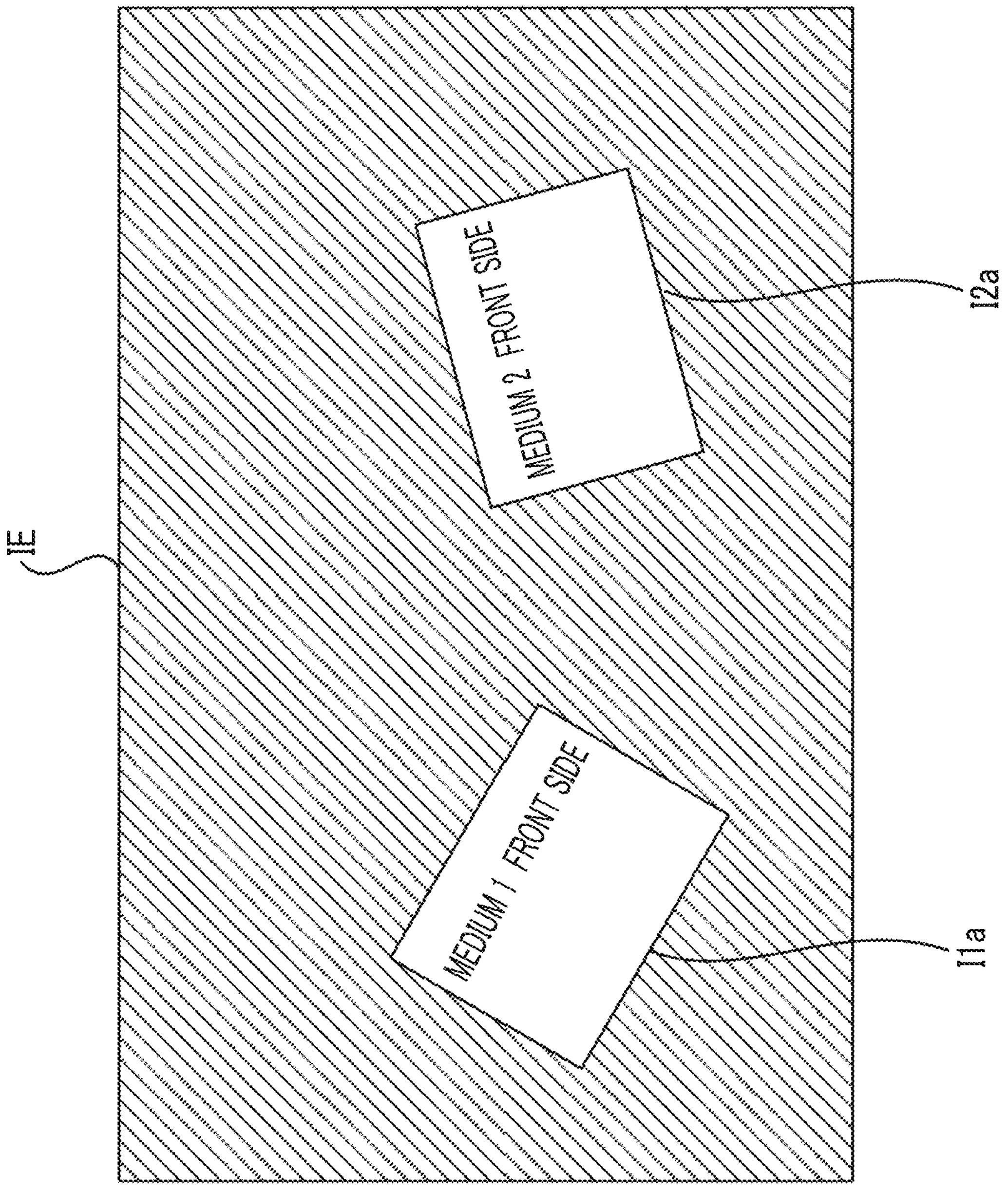
FIG. 6 is a diagram showing an example of an entire image acquired in the first imaging.

FIG. 5 is a diagram showing an example of a display state of the live view at the time of the first imaging for the two sets G1 and G2. FIG. 6 is a diagram showing an example of the entire image IE acquired in the first imaging.

At the time of imaging the document, the control unit 41 displays the live view LE imaged by the imaging unit 48 on the display input unit 43.

In the first imaging, the front-side document of the medium 1 of the set G1 and the front-side document of the medium 2 of the set G2 are placed on the placement unit 16 by the user.

In a case where the document is placed on the placement unit 16, the live view image L1a of the front-side document of the medium 1 and the live view image L2a of the front-side document of the medium 2 are displayed in the live view LE, as shown in FIG. 5.

The user checks the live view LE displayed on the display input unit 43, and inputs an imaging instruction to the image forming apparatus 10.

The control unit 41 receives the input of the imaging instruction from the user to perform the first imaging, and acquires an entire image IE in which the front-side document of the medium 1 and the front-side document of the medium 2 are shown, as shown in FIG. 6. Next, the control unit 41 extracts the image I1a of the front-side document of the medium 1 and the image I2a of the front-side document of the medium 2, from the entire image IE.

Figure 7:
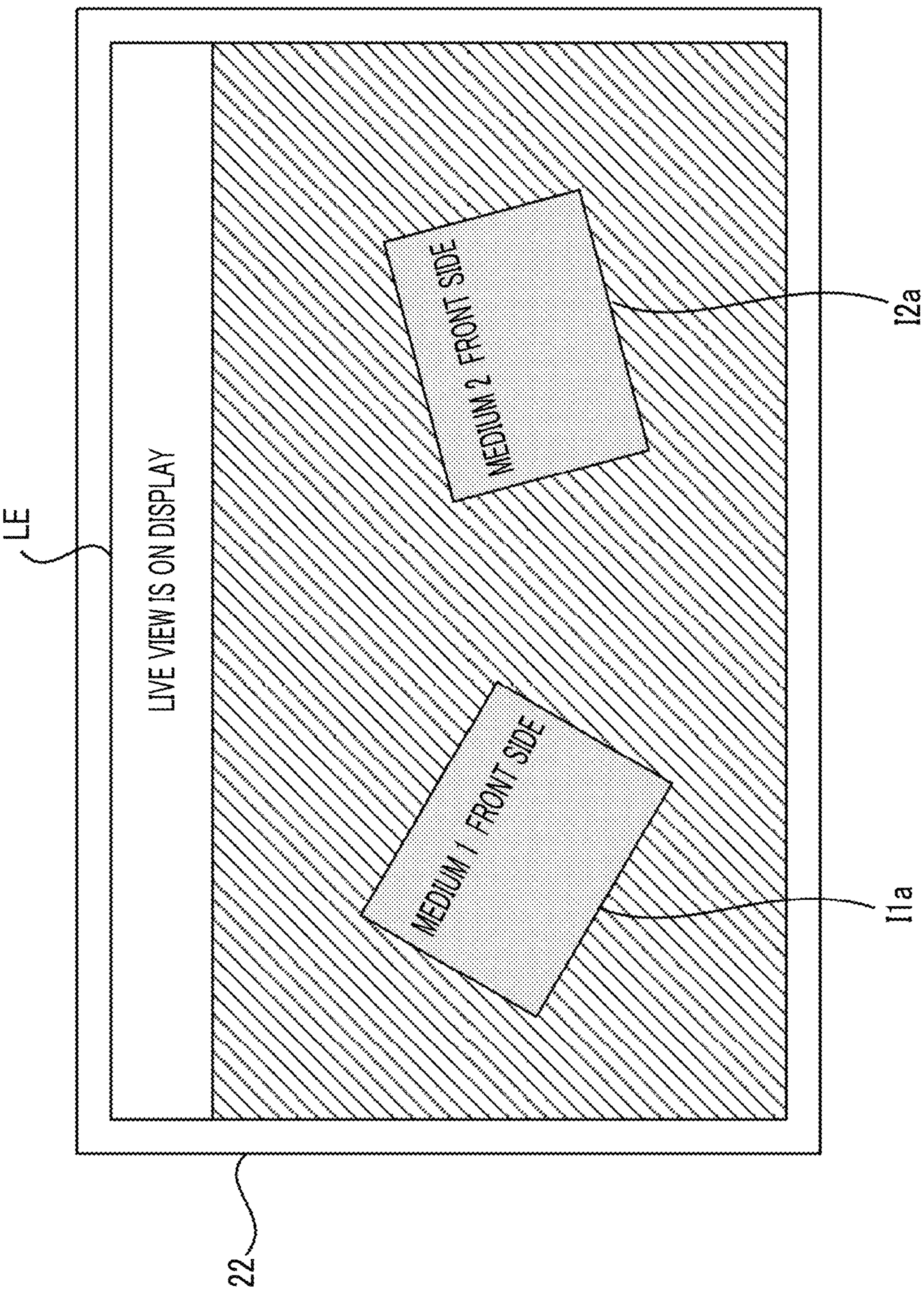
FIG. 7 is a diagram showing an example of a display state of a live view at the time of second imaging for the two sets, and is a diagram showing a state before a new document is placed.
Figure 8:
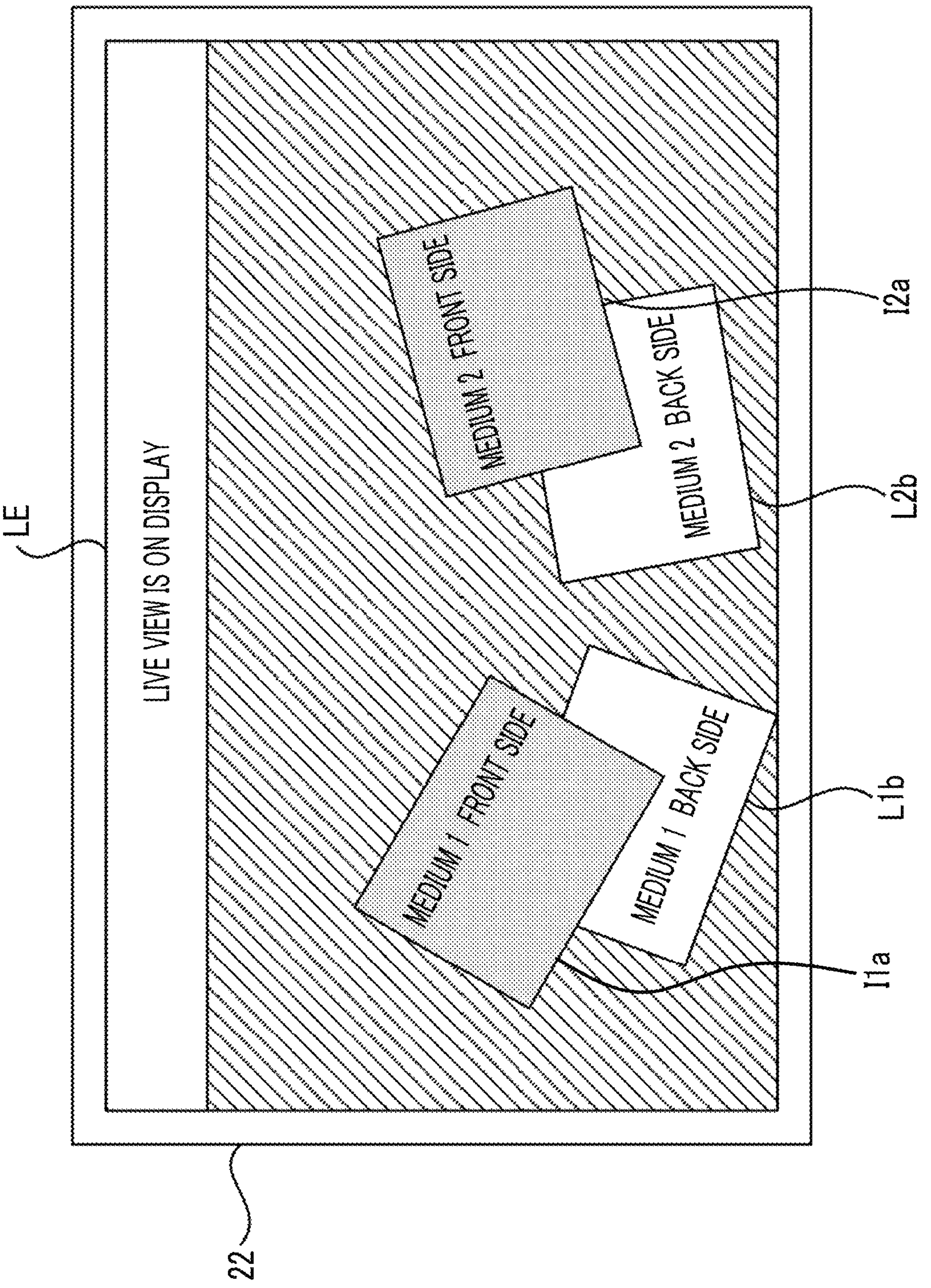
FIG. 8 is a diagram showing an example of a display state of a live view at the time of the second imaging for the two sets, and is a diagram showing a state after the new document is placed.
Figure 9:
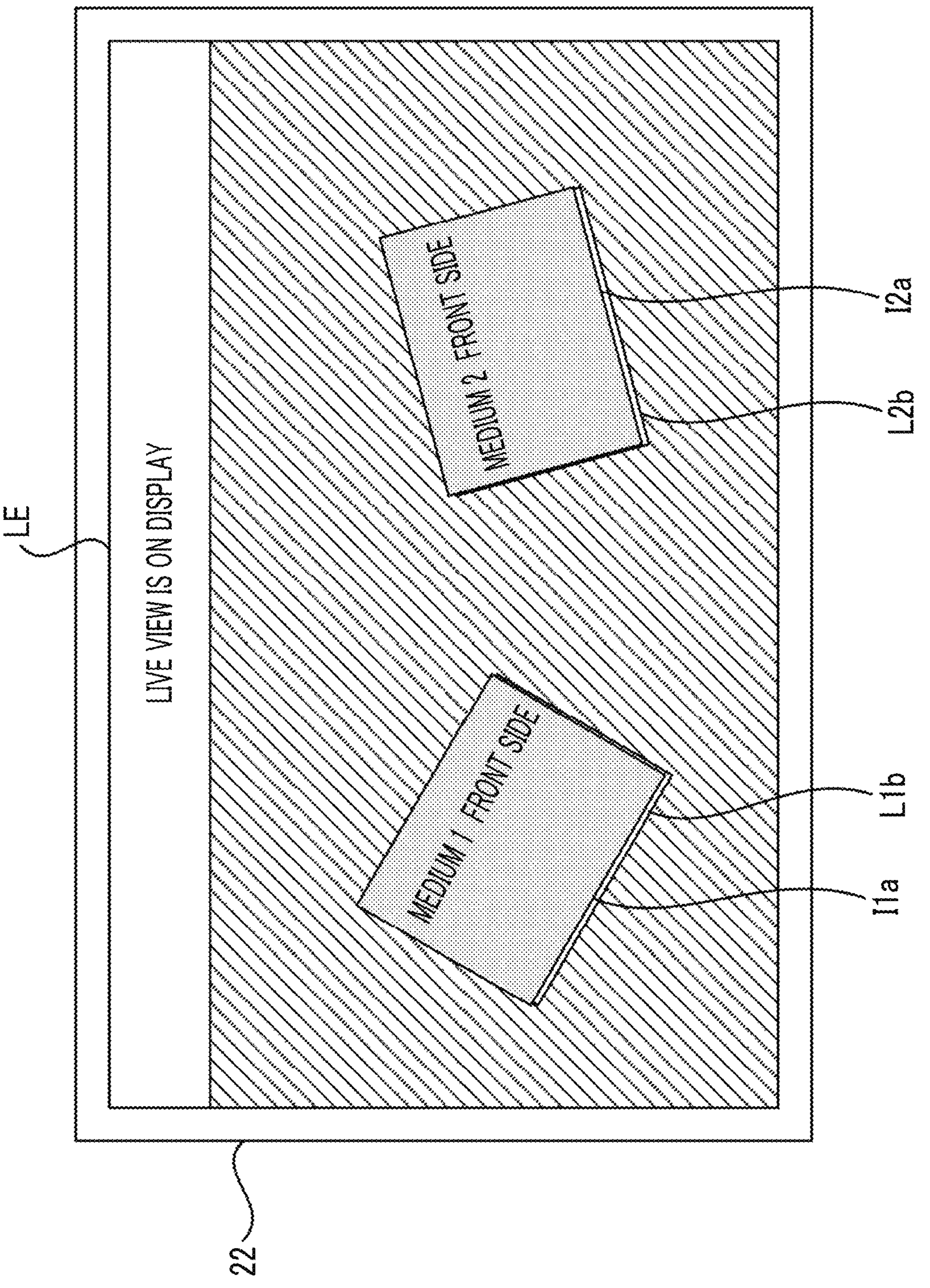
FIG. 9 is a diagram showing an example of a display state of a live view at the time of the second imaging for the two sets, and is a diagram showing a state after the new document is placed and alignment is performed.
Figure 10:
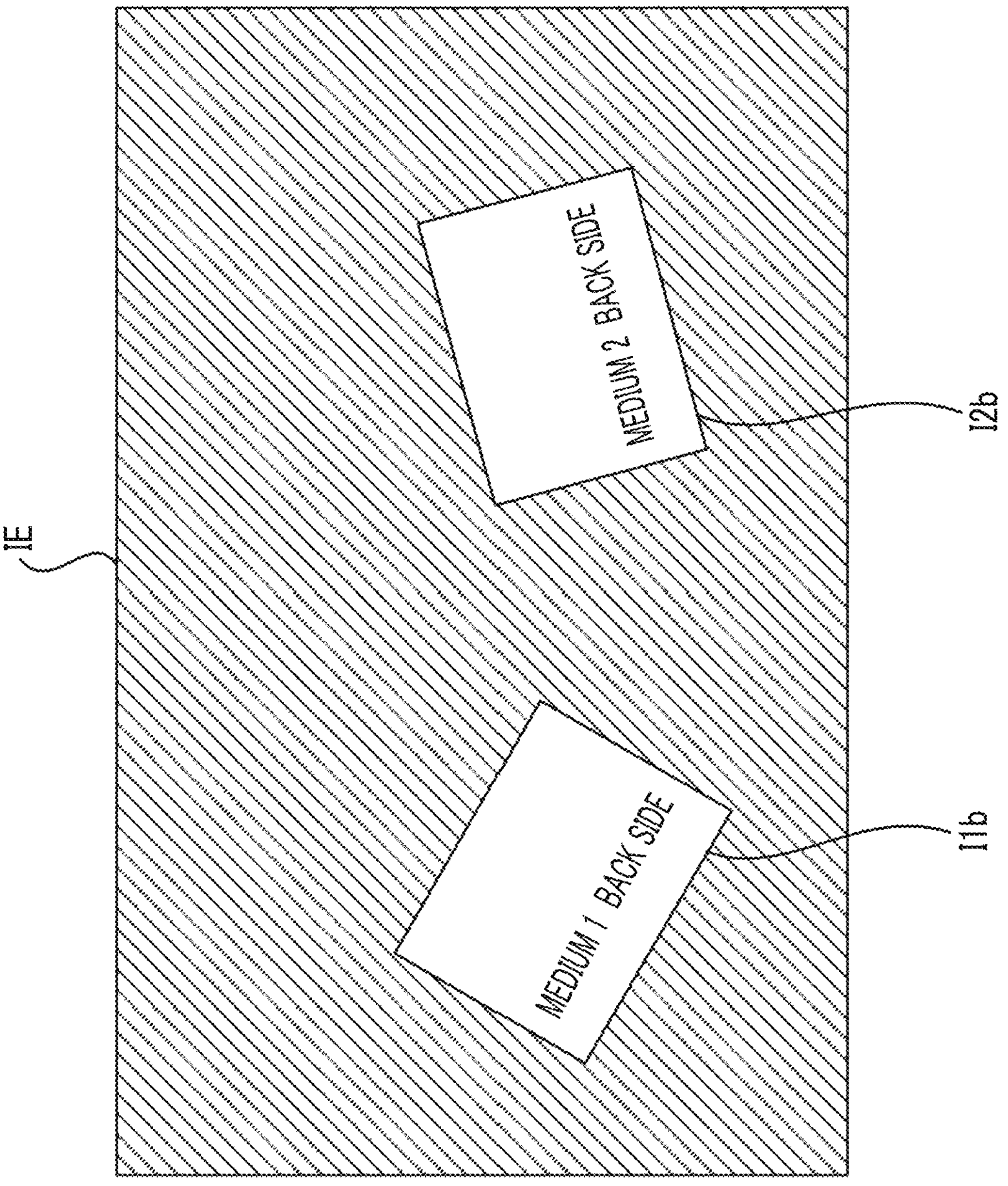
FIG. 10 is a diagram showing an example of an entire image acquired in the second imaging.

FIG. 7 is a diagram showing an example of a display state of a live view at the time of the second imaging for the two sets G1 and G2, and is a diagram showing a state before a new document is placed. FIG. 8 is a diagram showing an example of a display state of a live view at the time of the second imaging for the two sets G1 and G2, and is a diagram showing a state after a new document is placed. FIG. 9 is a diagram showing an example of a display state of a live view at the time of the second imaging for the two sets G1 and G2, and is a diagram showing a state after a new document is placed and alignment is performed. FIG. 10 is a diagram showing an example of the entire image IE acquired in the second imaging.

At the time of the second imaging, as illustrated in FIG. 7, the control unit 41 superimposes the image Ila of the front-side document of the medium 1 and the image I2a of the front-side document of the medium 2 acquired at the time of the first imaging as the guidance information, on the front side of the live view LE and displays the images at the same position as at the time of the first imaging.

The image I1a of the front-side document of the medium 1 and the image I2a of the front-side document of the medium 2 to be displayed as the guidance information may be displayed in the acquired state, or may be displayed after adjusting the brightness or chroma such that the images can be easily distinguished from the document imaged during the second time. Here, as an example, a case where the image Il a of the front-side document of the medium 1 and the image I2a of the front-side document of the medium 2 are displayed with reduced brightness is shown.

In the second imaging, the back-side document of the medium 1 of the set G1 and the back-side document of the medium 2 of the set G2 are placed on the placement unit 16 by the user.

In a case where the document is placed on the placement unit 16, the live view image L1b of the back-side document of the medium 1 and the live view image L2b of the back-side document of the medium 2 are displayed in the live view LE, as shown in FIG. 8.

The user checks the live view LE and the guidance information (the image Ila of the front-side document of the medium 1 and the image I2a of the front-side document of the medium 2 acquired at the time of the first imaging) displayed on the display input unit 43, and aligns the document for the second imaging.

Specifically, as shown in FIG. 9, the user aligns the back-side document of the medium 1 such that the image I1a of the front-side document of the medium 1 and the live view image L1b of the back-side document of the medium 1 overlap. Further, the user aligns the back-side document of the medium 2 such that the image I2a of the front-side document of the medium 2 and the live view image L2b of the back-side document of the medium 2 overlap.

The user checks the live view LE displayed on the display input unit 43, and inputs an imaging instruction to the image forming apparatus 10.

The control unit 41 receives the input of the imaging instruction from the user to perform the second imaging, and acquires an entire image IE in which the back-side document of the medium 1 and the back-side document of the medium 2 are shown, as shown in FIG. 10. Next, the control unit 41 extracts the image Ilb of the back-side document of the medium 1 and the image I2b of the back-side document of the medium 2, from the entire image IE.

In this way, since the guidance information is superimposed on the live view LE and displayed at the time of the second imaging, the user can place the front-side document and the back-side document of each medium in the position where the front-side document and the back-side document overlap each other, in the first imaging and the second imaging.

Therefore, the control unit 41 manages the image I1a of the front-side document of the medium 1 acquired at the time of the first imaging and the image Ilb of the back-side document of the medium 1 shown at a position overlapping the image I1a of the front-side document of the medium 1 at the time of the second imaging in association with the documents of the set Gl. Similarly, the control unit 41 manages the image I1a of the front-side document of the medium 2 acquired at the time of the first imaging and the image I2b of the back-side document of the medium 2 shown at a position overlapping the image I1a of the front-side document of the medium 2 at the time of the second imaging in association with the documents of the set G2.

Note that "the image of the back-side document shown at a position overlapping the image of the front-side document" is not limited to an aspect in which the image of the front-side document and the image of the back-side document completely overlap each other, and may be an aspect in which the image of the front-side document and the image of the back-side document partially overlap each other.

The method of determining whether or not the image of the front-side document overlaps the image of the back-side document is not particularly limited, and any method may be used. For example, in a case where the area where the image of the back-side document overlaps the image of the front-side document is equal to or more than a set threshold value, it may be determined that the two images overlap, and in a case where the area is less than the threshold value, it may be determined that the two images do not overlap. In this case, the threshold value may be, for example, 50% or more.

With respect to the image of a document of each set, for example, a job such as file transfer, fax, or printing may be executed on one document file of each set, based on a user's instruction.

Figure 11:
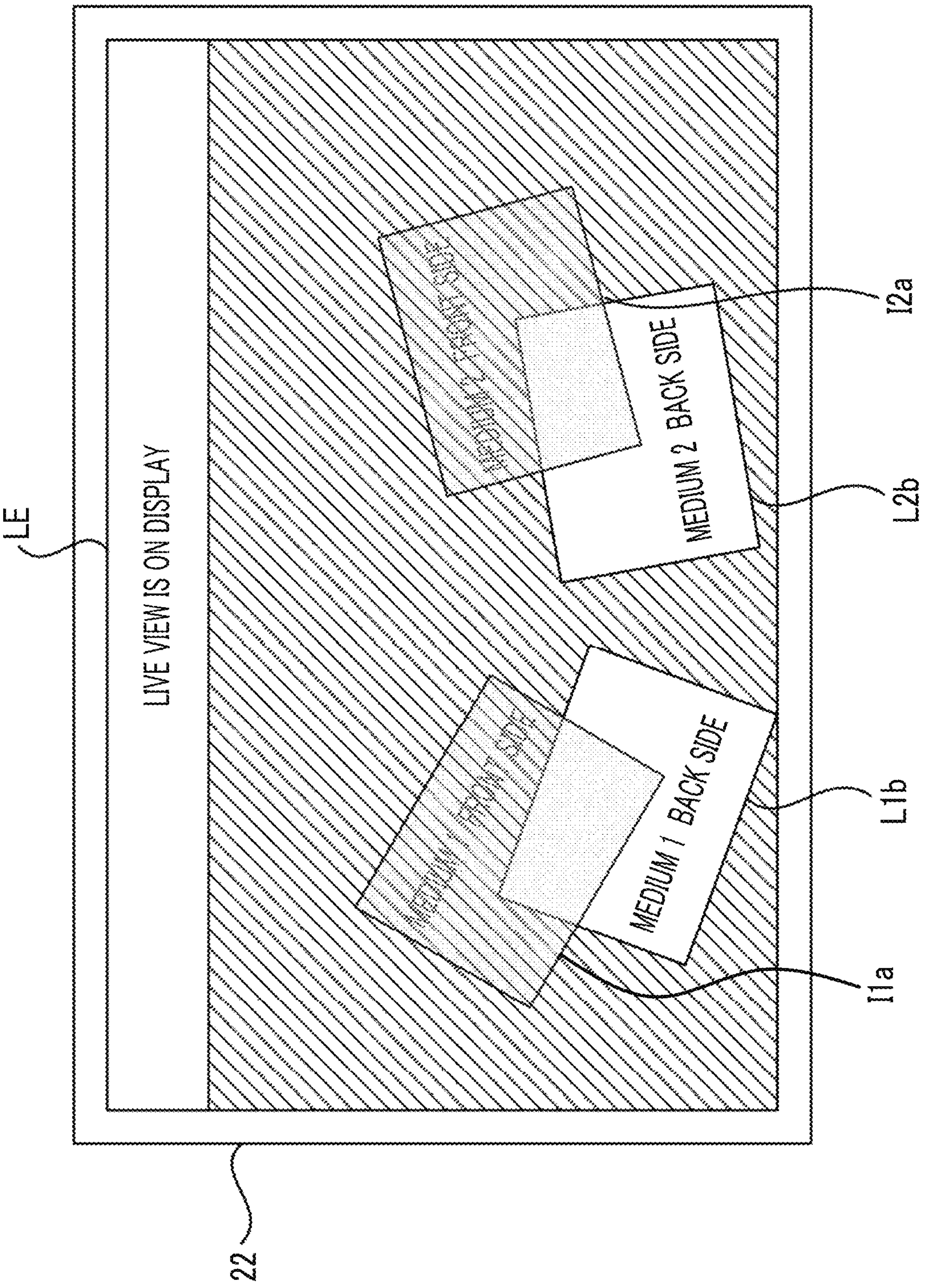
FIG. 11 is a diagram showing another example of the display state of the live view at the time of the second imaging for the two sets.

In addition to the images of the documents acquired in the past imaging as described above, the guidance information may be images in a state in which the images of the documents acquired in the past imaging are made transparent at a preset transparency, as shown in FIG. 11.

In such an aspect, at the time of the second imaging, in a case where the user aligns the document for the second imaging, even in a case where the document for the second imaging overlaps the guidance information, the user can visually recognize the document for the second imaging.

Figure 12:
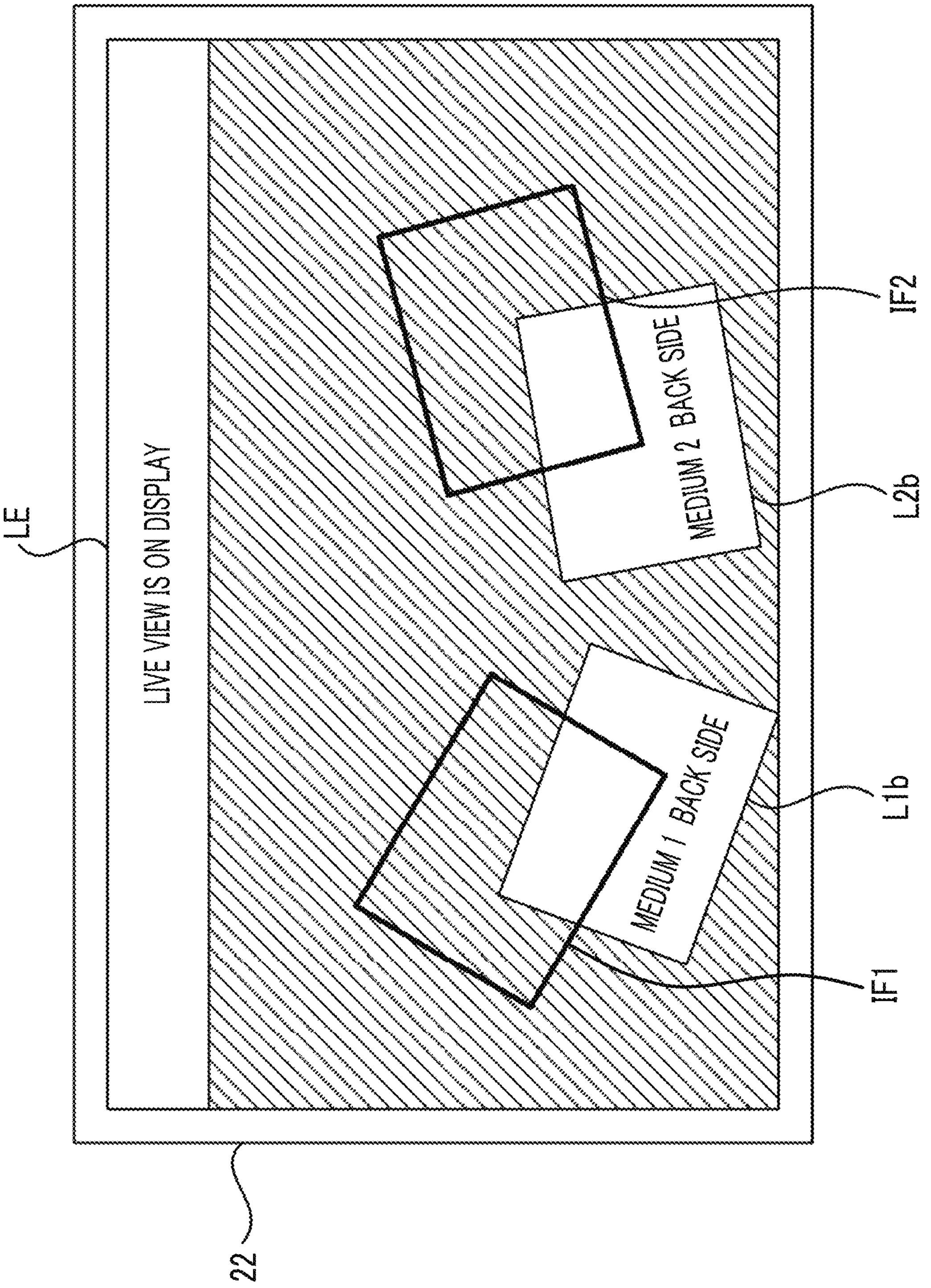
FIG. 12 is a diagram showing another example of the display state of the live view at the time of the second imaging for the two sets.

Further, as shown in FIG. 12, the guidance information may be the images IF1 and IF2 of a frame representing the outline of each document acquired in the past imaging.

Figure 13:
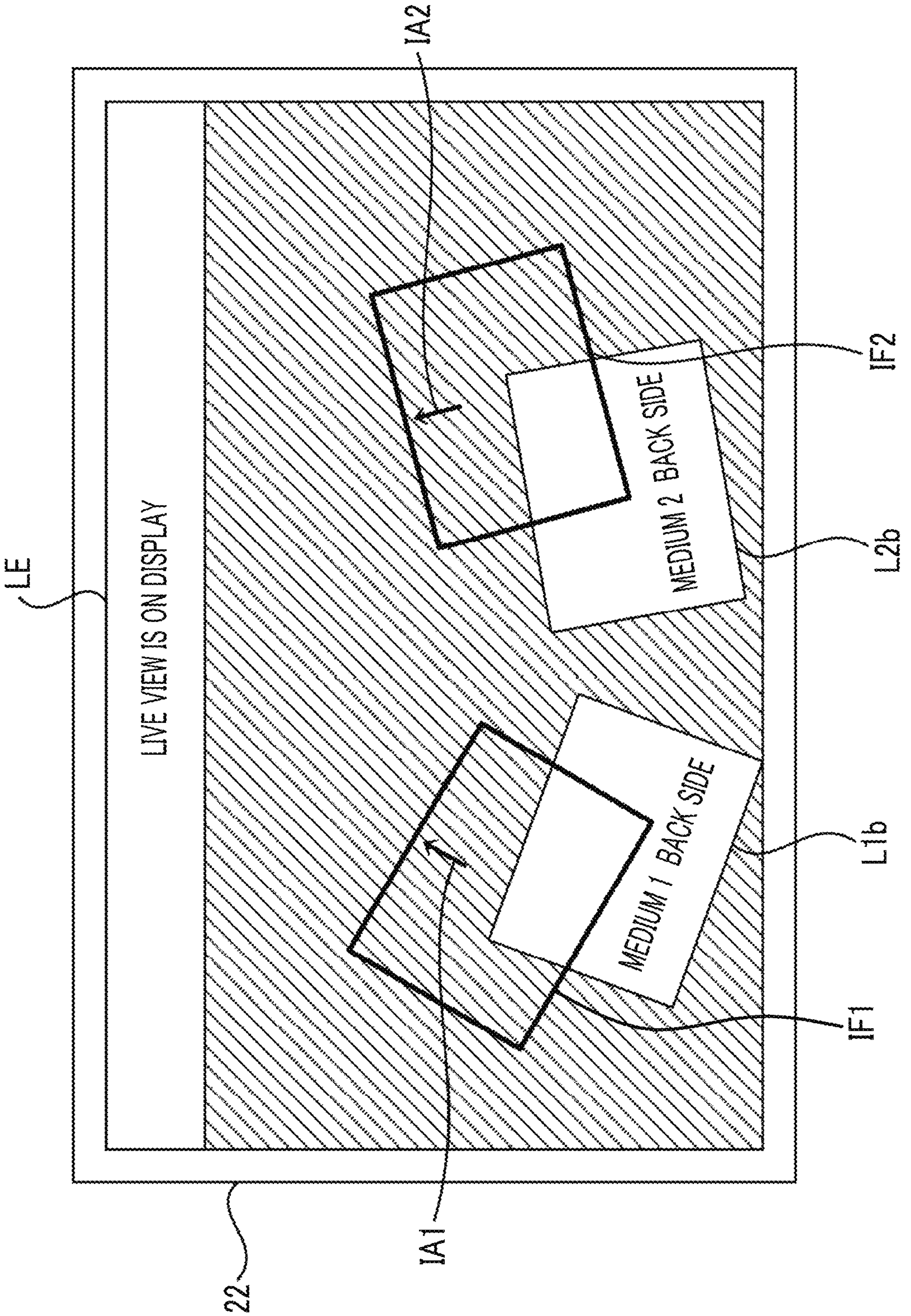
FIG. 13 is a diagram showing another example of the display state of the live view at the time of the second imaging for the two sets.

In this case, as shown in FIG. 13, the guidance information may include an image indicating at least one of the up, down, right, or left directions of each document. FIG. 13 shows an example in which arrows IA1 and IA2 indicating the upward direction of each document are displayed.

Further, the control unit 41 may change the transparency in displaying the guidance information in accordance with the user operation.

Further, the control unit 41 may switch between the display state and the hidden state of the guidance information in accordance with the user operation.

Figure 14:
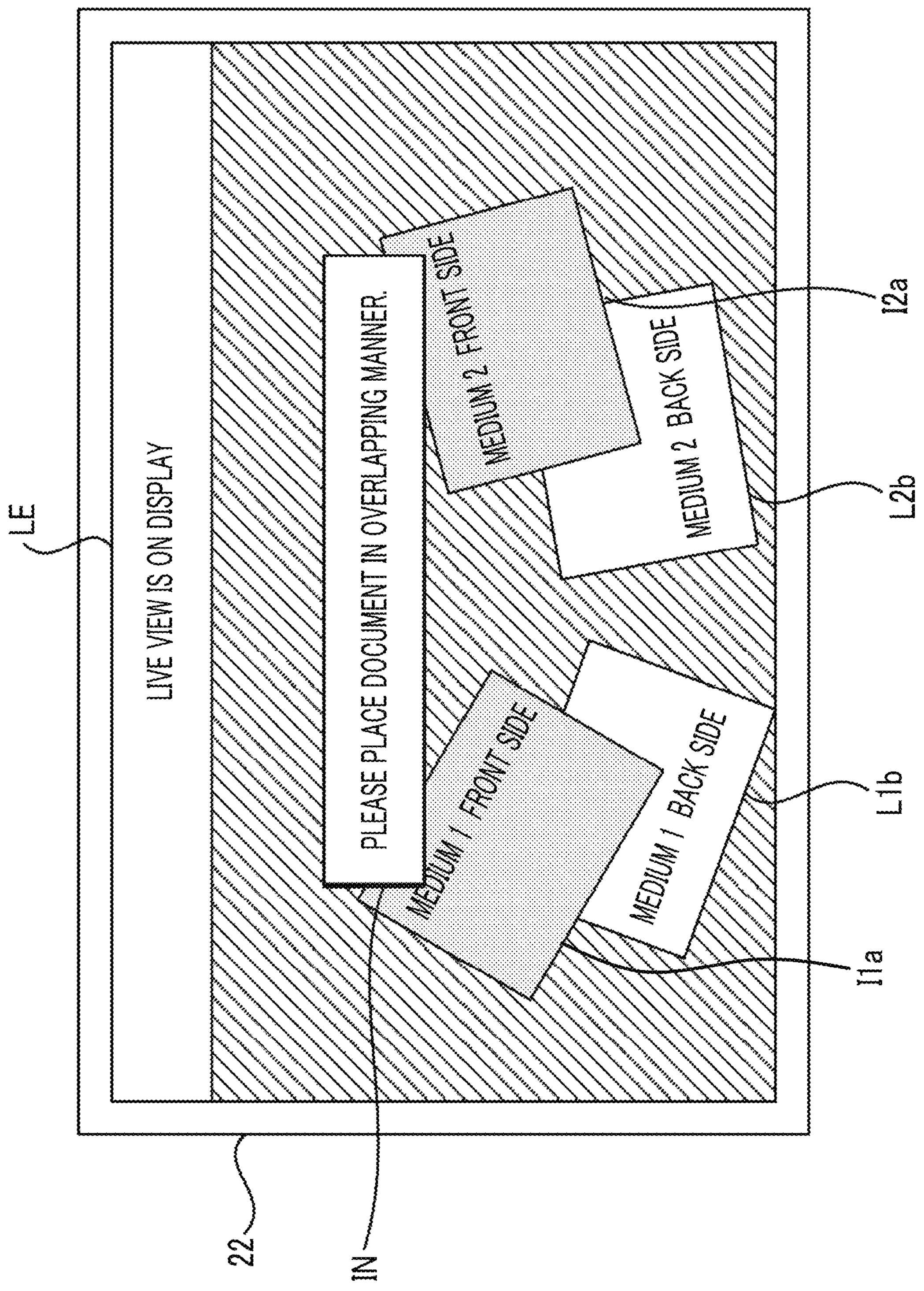
FIG. 14 is a diagram showing another example of the display state of the live view at the time of the second imaging for the two sets.

Further, in a case where the document is placed at a position where the document does not overlap with the guidance information, at the time of the second and subsequent imaging, for example, as shown in FIG. 14, the control unit 41 may cause the notification display image IN in which a message such as "Please place the document in an overlapping manner." is described to be superimposed on the live view LE and displayed.

The method of determining whether or not the document and the guidance information overlap is not particularly limited, and any method may be used. For example, in a case where the area where the document area overlaps with the display area of the guidance information is equal to or greater than a set threshold value, it may be determined that the document and the guidance information overlap each other, and in a case where the area is less than the threshold value, it may be determined that the document and the guidance information do not overlap each other. In this case, the threshold value may be, for example, 50% or more.

Figure 15:
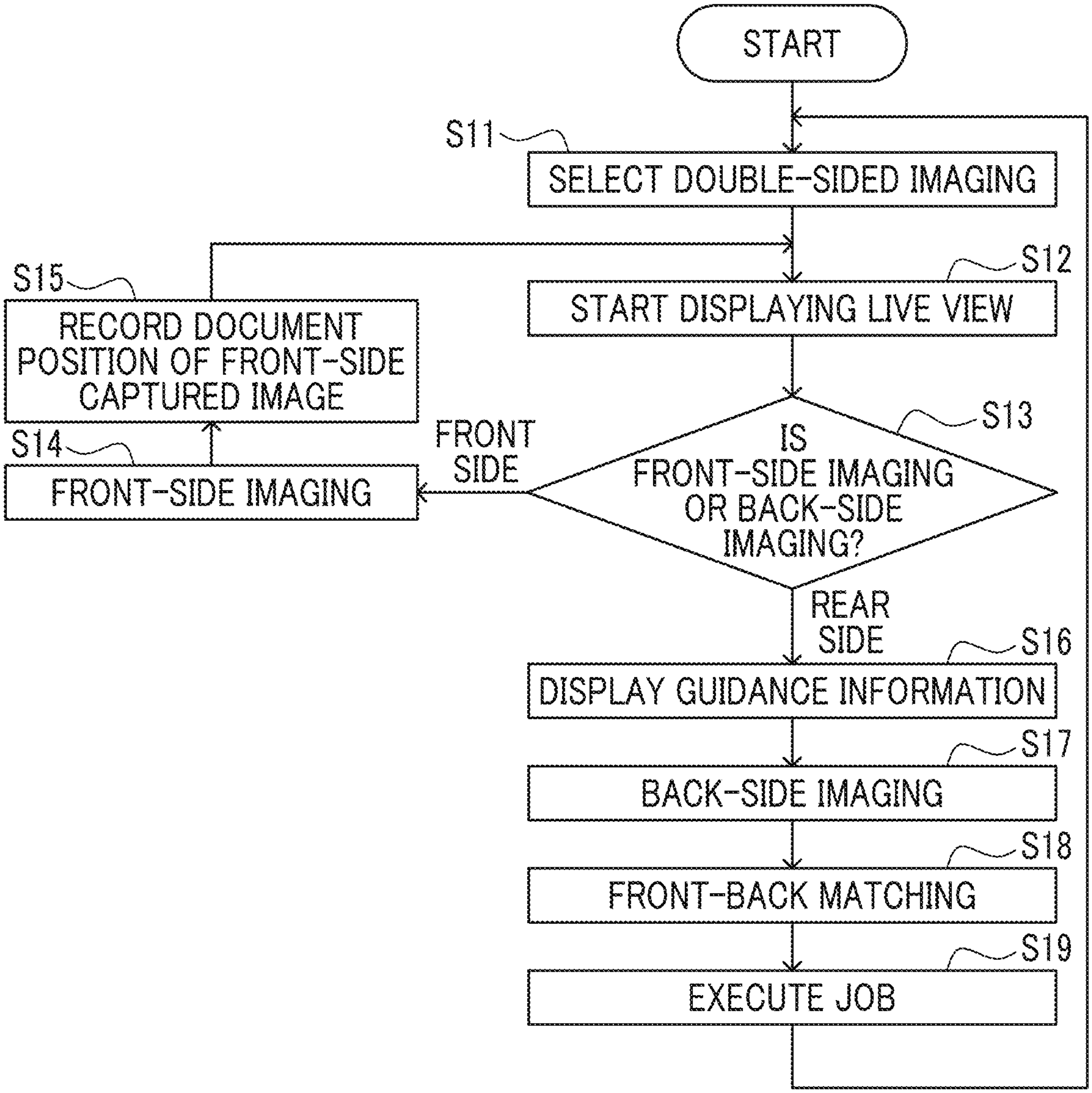
FIG. 15 is a flowchart showing a processing flow at the time of imaging a document in the image forming apparatus.

Next, a process at the time of imaging a document in the image forming apparatus 10 will be described with reference to the flowchart of FIG. 15.

First, in a case where in step S11, the user selects the double-sided imaging, the control unit 41 starts displaying the live view in step S12. Here, "double-sided imaging" means that, as described above, both sides of the front-side document and the back-side document of each of a plurality of media are imaged. Further, it is assumed that the front-side document of each of the plurality of media is imaged in the first imaging and the back-side document of each of the plurality of media is imaged in the second imaging.

Next, in step S13, the control unit 41 determines whether either imaging of the front-side document of the medium or imaging of the back-side document is performed.

In a case where it is determined in step S13 that the front side imaging, that is, the first imaging is performed, the control unit 41 performs imaging of the front-side document of each of the plurality of media in step S14, records the document position of the front-side document of each of the plurality of media in the front-side captured image in step S15, and transitions to step S12.

In a case where it is determined in step S13 that the back side imaging, that is, the second imaging is performed, the control unit 41 uses the front-side document of each of the plurality of media acquired in the first imaging to display guidance information in step S16, and images the back-side document of each of the plurality of media in step S17.

Next, in step S18, the control unit 41 performs matching between the front-side document and the back-side document for each medium, and manages the documents for each set. Here, the matching means a process of combining a front-side document and a back-side document of the same medium.

Finally, in step S19, the control unit 41 executes a job such as file transfer, fax, or printing on the images of the documents of each set, based on the instruction of the user, and transitions to step S11.

Modification Wxample

Although the image forming apparatus according to the exemplary embodiment of the present invention has been described above, the present invention is not limited to the above exemplary embodiment and may be appropriately modified.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, the case where the present invention is applied to the image forming apparatus has been described, but the present invention is not limited thereto, and the present invention can also be applied to various types of image processing apparatuses such as a mobile phone, a tablet, or a personal computer.

Supplementary Notes

Hereinafter, aspects of the present disclosure will be described.

(((1)))

An image processing apparatus comprising:

a processor configured to:

display, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging.

(((2)))

The image processing apparatus according to (((1))), wherein the guidance information is images of the documents acquired in the past imaging.

(((3)))

The image processing apparatus according to (((2))), wherein the guidance information is images in a state in which the images of the documents acquired in the past imaging are made transparent at a preset transparency.

(((4)))

The image processing apparatus according to (((1))), wherein the guidance information is an image of a frame representing an outline of each document acquired in the past imaging.

(((5)))

The image processing apparatus according to (((4))), wherein the guidance information includes an image indicating at least one of up, down, right, or left directions of each document.

(((6)))

The image processing apparatus according to any one of (((1))) to (((5))), wherein the processor is configured to:

change a transparency in displaying the guidance information in accordance with a user operation.

(((7)))

The image processing apparatus according to any one of (((1))) to (((6))), wherein the processor is configured to:

switch between a display state and a hidden state of the guidance information in accordance with a user operation.

(((8)))

The image processing apparatus according to any one of (((1))) to (((7))), wherein the plurality of documents included in each set are a front-side document and a back-side document of one medium.

(((9)))

A program causing a computer to execute a process comprising:

displaying, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a processor configured to:

display, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging, wherein the guidance information is images of the documents acquired in the past imaging; and the guidance information and an image of the document of each set acquired in the second and subsequent imaging overlap each other on the display unit.

2. The image processing apparatus according to claim 1, wherein the guidance information is images in a state in which the images of the documents acquired in the past imaging are made transparent at a preset transparency.

3. The image processing apparatus according to claim 1, wherein the guidance information is an image of a frame representing an outline of each document acquired in the past imaging.

4. The image processing apparatus according to claim 3, wherein the guidance information includes an image indicating at least one of up, down, right, or left directions of each document.

5. The image processing apparatus according to claim 1, wherein the processor is configured to:

change a transparency in displaying the guidance information in accordance with a user operation.

6. The image processing apparatus according to claim 1, wherein the processor is configured to:

switch between a display state and a hidden state of the guidance information in accordance with a user operation.

7. The image processing apparatus according to claim 1, wherein the plurality of documents included in each set are a front-side document and a back-side document of one medium.

8. A non-transitory computer readable medium storing a program causing a computer to execute a process comprising:

displaying, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging, wherein the guidance information is images of the documents acquired in the past imaging; and the guidance information and an image of the document of each set acquired in the second and subsequent imaging overlap each other on the display unit.

9. An image processing method comprising:

displaying, in a case where there are a plurality of sets each consisting of a plurality of documents, and a plurality of sheets of documents including at least one sheet of a document of each of all or part of the plurality of sets are simultaneously imaged by an imaging unit that images a document, guidance information for guiding a placement position of the document of each set to be superimposed on an image imaged by the imaging unit and representing a current state, on a display unit, in second and subsequent imaging, by using information pertaining to documents acquired in past imaging, wherein the guidance information is images of the documents acquired in the past imaging; and the guidance information and an image of the document of each set acquired in the second and subsequent imaging overlap each other on the display unit.

* * * * *